Patented Nov. 29, 1932

1,889,088

UNITED STATES PATENT OFFICE

MARC DARRIN, OF PITTSBURGH, PENNSYLVANIA, ASSIGNOR TO F. N. BURT COMPANY, LIMITED, OF TORONTO, ONTARIO, CANADA, A CORPORATION OF ONTARIO, CANADA

COMPOSITION OF MATTER

No Drawing.    Application filed September 3, 1930.   Serial No. 479,583.

This invention relates to a composition of matter.

It is an object of this invention to provide a composition of matter and articles made from the same which will be strong, durable and rigid and resistant.

In my copending application Serial #415,819, filed December 21, 1929 for the reissue of Patent #1,644,711, reissued November 11, 1930, Serial No. 17,867, the fact is disclosed that sulphur may be caused to penetrate into the pores of paper and paper pulp by the addition of small quantities of introfiers, the introfier particularly recommended in that application being naphthalene. In that application, it is contemplated that the proportions of the sulphur to the introfier shall be at least 9 to 1.

In my copending application Serial #417,827 the fact is disclosed that certain chlorine substitution products of diphenyls form excellent introfiers for the introduction of sulphur and possess a hardness, rigidity and resistivity which render them desirable in themselves as impregnants either alone or jointly with other substances, and in addition thereto they possess the desirable property of rendering the product fireproof.

In accordance with this invention it has been disclosed, particularly where chlorodiphenyl is used as an introfier, that very desirable products can be obtained by the impregnation of paper material such as paper, paper pulp, board, fiber or similar compositions with mixtures of sulphur and chlorodiphenyls, in which large quantities of the chlorodiphenyls are employed. In accordance with this invention, I preferably employ a mixture containing from 15 to 80% chlorodiphenyl, the remainder being sulphur or chiefly sulphur. This mixture possesses advantages which are possessed by neither of the substances when used alone and which do not inhere in the product of the patent.

A wide number of substances come under the class of chlorodiphenyls differing from each other in the number of cyclic nuclei connected together in the molecule, the manner in which they are connected and in the position and extent of the chlorine substitution. Their homologues are also included as for instance dinaphthyls. In general I prefer to employ the more completely halogenated products because of their greater resistance to combustion. When substantial percentages of the chlorodiphenyls are added to the sulphur as when the chlorodiphenyl exceeds fifteen percent of the mass, the fire retarding effect becomes valuable, and as the quantities are increased, the inflammability decreases until the product becomes fire-proof when it comprises about sixty five percent of the mass.

The chlorinated two-cyclic diphenyl is softer and more fluid, also at times crystalline, whereas the chlorinated higher diphenyls are harder, non-crystalline, resinous and tough. A desirable compound for impregnation, therefore, may be formed by including about 60 to 80% of the chlorinated two-cyclic diphenyl and 20 to 40% of the chlorinated higher diphenyls. The larger the proportion of chlorinated diphenyls in the impregnating bath, the more important it is to have present the tough, resinous chlorinated higher diphenyls.

In forming a suitable impregnating compound, therefore, I may take 35 parts of sulphur and 65 parts of chlorodiphenyls of about the proportions outlined above. The paper material may be impregnated by dipping into the molten bath either with or without the application of pressure or vacuum until the pores are completely filled. This results in a hard, resistant, impervious, fireproof substance.

If it is desired only to impregnate the outer layer or to make a surface coating upon the product, the mixture may be applied externally as for instance by spraying or brushing, either in a molten, plastic or powdered state. Then the article may be gently heated until the mixture is absorbed into the surface. By reason of the high content of chlorodiphenyls the mixture will not support combustion.

Dye stuffs may be readily introduced into the mixture through the medium of the chlorodiphenyls, in which many dyes are soluble and in this way a wide variety of pleasing effects may be obtained.

It will be understood that whereas chlorine and chlorine substitution has been referred to in the foregoing and in the claims, that for many purposes the corresponding brominated or otherwise halogenated products may be employed within the scope of this invention.

Since certain modifications in the composition which embody the invention may be made without departing from its scope, it is intended that all matter contained in the above description shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

Having described my invention, what I claim as new and desire to secure by Letters Patent, is:—

1. A composition of matter comprising a paper material impregnated with a mixture containing sulphur and chlorodiphenyl.

2. A composition of matter comprising a paper material impregnated with a mixture containing sulphur and chlorodiphenyl, the chlorodiphenyl being in proportions substantially to retard combustion.

3. A composition of matter comprising a paper material impregnated with a mixture containing sulphur and chlorodiphenyl, the chlorodiphenyl being in excess of fifteen percent.

4. A composition of matter comprising a paper material impregnated with a mixture containing sulphur and chlorodiphenyl containing about sixty five percent chlorodiphenyl.

5. A composition of matter comprising a paper material impregnated with a mixture containing sulphur and chlorodiphenyl and containing a substantial amount of the higher chlorodiphenyls.

In testimony whereof I affix my signature.

MARC DARRIN.